(12) United States Patent
Peters et al.

(10) Patent No.: US 9,687,784 B2
(45) Date of Patent: Jun. 27, 2017

(54) EXHAUST SYSTEM HAVING SEGMENTED SERVICE FLANGE

(71) Applicant: Tenneco Automotive Operating Company Inc., Lake Forest, IL (US)

(72) Inventors: Erwin Peters, Cement City, MI (US); Keith Pieniazek, Ypsilanti, MI (US); Kevin Reeder, Carson City, MI (US); Dennis Mellon, Parma, MI (US); Dan Eggleston, Grass Lake, MI (US); Mickey Neal, Jackson, MI (US); Andy Porter, Michigan Center, MI (US); Matthew Anderson, Hanover, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/677,012

(22) Filed: Apr. 2, 2015

(65) Prior Publication Data
US 2015/0285413 A1    Oct. 8, 2015

Related U.S. Application Data

(60) Provisional application No. 61/976,966, filed on Apr. 8, 2014.

(51) Int. Cl.
*B01D 50/00*    (2006.01)
*B01D 53/94*    (2006.01)
(Continued)

(52) U.S. Cl.
CPC ..... *B01D 53/9431* (2013.01); *F01N 13/1805* (2013.01); *F01N 13/1816* (2013.01);
(Continued)

(58) Field of Classification Search
CPC ................................ E03D 11/00; B01D 50/00
See application file for complete search history.

(56) References Cited

U.S. PATENT DOCUMENTS 1,784,667 A * 12/1930 Gillet ...................... F16B 21/16
285/415
4,515,398 A * 5/1985 Machon, Sr. ........... E03D 11/16
285/12
(Continued)

FOREIGN PATENT DOCUMENTS

DE    102004051680 A1    5/2006
DE    102011118862 A1    5/2013
(Continued)

*Primary Examiner* — Jyoti Nagpaul
(74) *Attorney, Agent, or Firm* — Harness, Dickey & Pierce, P.L.C.

(57) ABSTRACT

An assembly may include first and second components and a service flange. The first component has a first opening. The second component has a second opening in communication with the first opening. The service flange may be mounted to the first component such that the first component is disposed between the service flange and the second component. The service flange extends around the periphery of the first opening and may include a plurality of separate and discrete segments that are individually secured to the first component. Adjacent segments define joints that movably connect the segments together while allowing for relative movement between the segments before the first component is secured to the second component. The segments include mounting apertures spaced apart from the joints and receiving fasteners configured to fixedly secure the first component to the second component. Each fastener only engages a single segment of the service flange.

22 Claims, 6 Drawing Sheets

(51) Int. Cl.
  *F01N 13/18*   (2010.01)
  *F16L 23/028*  (2006.01)
  *F16L 23/032*  (2006.01)
  *F16L 23/12*   (2006.01)

(52) U.S. Cl.
  CPC ..... *F01N 13/1827* (2013.01); *F01N 13/1855* (2013.01); *F16L 23/028* (2013.01); *F16L 23/032* (2013.01); *F16L 23/12* (2013.01); *Y10T 29/49398* (2015.01)

(56) References Cited

U.S. PATENT DOCUMENTS

| | | | |
|---|---|---|---|
| 5,314,215 A | 5/1994 | Weinhold | |
| 5,406,795 A | 4/1995 | Raub et al. | |
| 5,492,372 A * | 2/1996 | Dranberg | E03D 11/16 285/15 |
| 5,890,239 A * | 4/1999 | Hite | E03D 11/16 285/56 |
| 6,026,521 A | 2/2000 | Atkins | |
| 6,155,045 A | 12/2000 | Durr et al. | |
| 6,254,142 B1 | 7/2001 | Kaifel et al. | |
| 6,315,335 B1 | 11/2001 | Seedorff | |
| 6,688,103 B2 | 2/2004 | Pleuss et al. | |
| 6,926,282 B2 | 8/2005 | Werz et al. | |
| 7,231,762 B2 | 6/2007 | Bassani | |
| 7,887,100 B1 | 2/2011 | Paolone | |
| 7,975,473 B2 | 7/2011 | Marotta et al. | |
| 8,230,680 B2 | 7/2012 | Riekers et al. | |
| 8,267,438 B2 | 9/2012 | Radzik et al. | |
| 8,661,802 B2 | 3/2014 | Riekers et al. | |
| 8,821,608 B2 | 9/2014 | Mitsuda | |
| 2004/0113370 A1 | 6/2004 | Beutter et al. | |
| 2005/0257982 A1 | 11/2005 | Cook et al. | |
| 2007/0216109 A1 | 9/2007 | Friedow | |

FOREIGN PATENT DOCUMENTS

| | | |
|---|---|---|
| EP | 0292754 A1 | 11/1988 |
| EP | 1288555 A2 | 3/2003 |
| FR | 2873425 A1 | 1/2006 |
| JP | 2000130663 A | 5/2000 |
| JP | 2001263057 A | 9/2001 |
| JP | 2005120966 A | 5/2005 |
| JP | 2005127205 A | 5/2005 |
| JP | 3769357 B2 | 4/2006 |
| JP | 2008309120 A | 12/2008 |
| JP | 2010255524 A | 11/2010 |
| JP | 4848353 B2 | 12/2011 |
| JP | 2013160145 A | 8/2013 |
| KR | 101046324 B1 | 7/2011 |

* cited by examiner

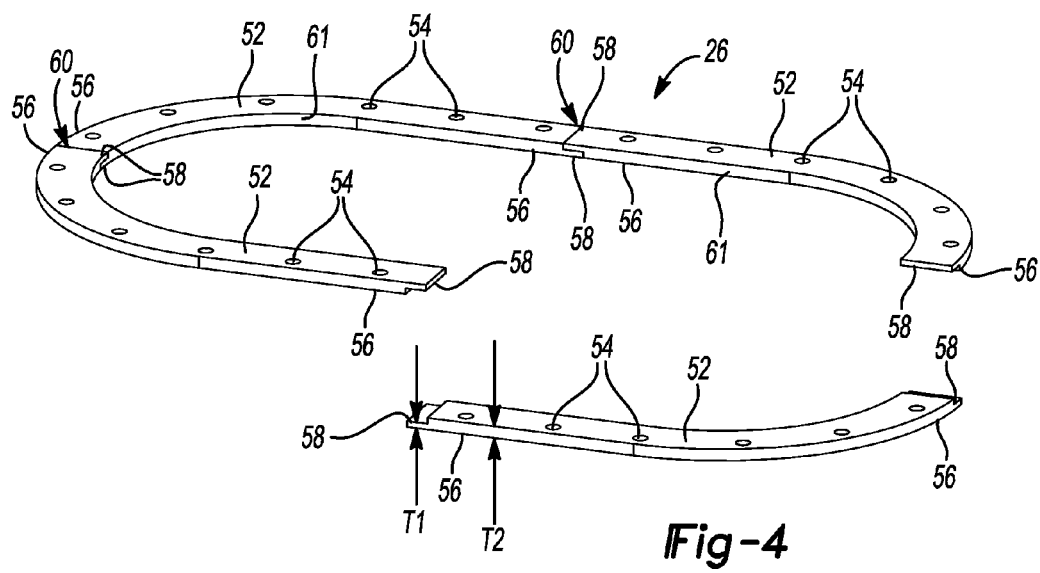
Fig-4
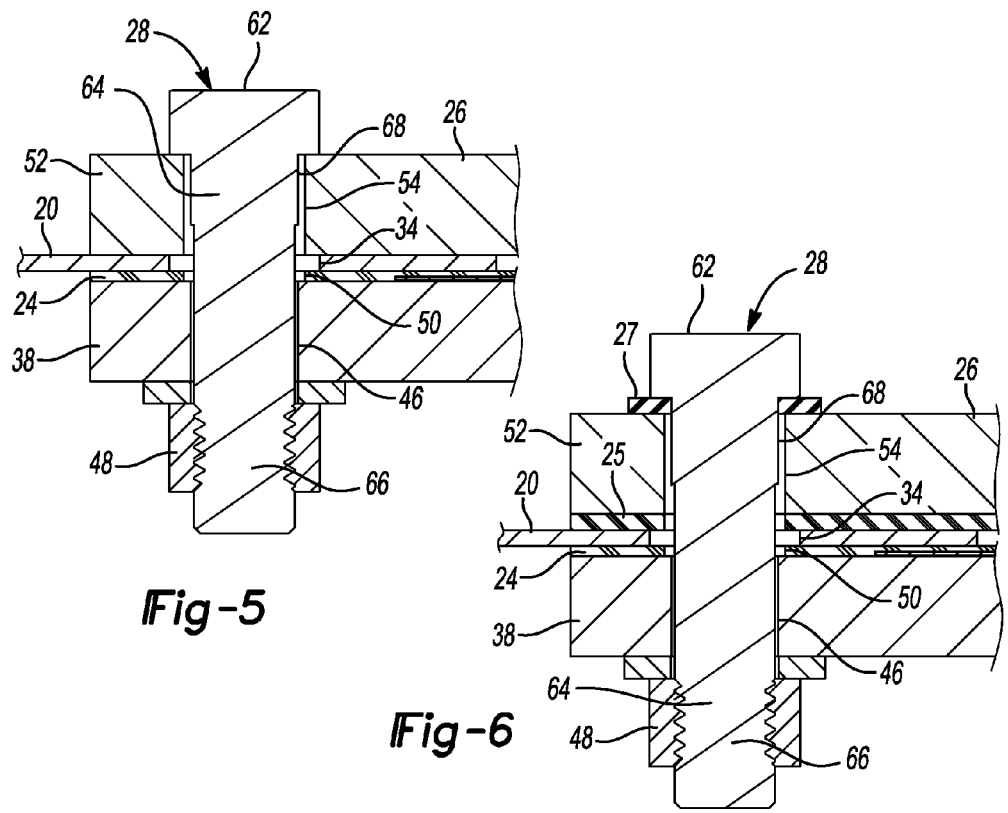
Fig-5
Fig-6

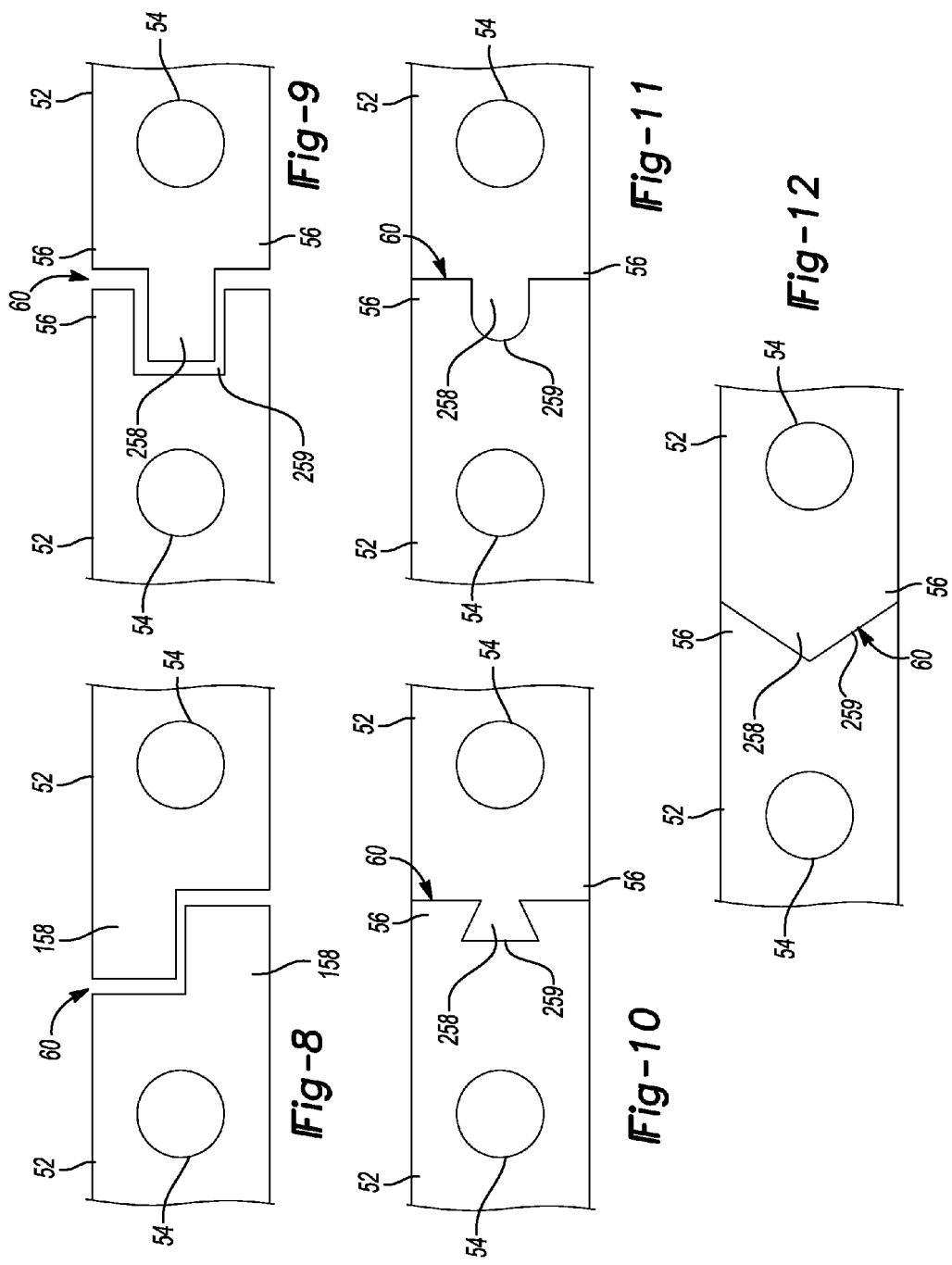

EXHAUST SYSTEM HAVING SEGMENTED SERVICE FLANGE

CROSS-REFERENCE TO RELATED APPLICATIONS

This application claims the benefit of U.S. Provisional Application No. 61/976,966, filed on Apr. 8, 2014. The entire disclosure of the above application is incorporated herein by reference.

FIELD

The present disclosure relates to an exhaust system having a segmented service flange.

BACKGROUND

This section provides background information related to the present disclosure and is not necessarily prior art.

The fabrication and assembly of exhaust systems can be time-consuming and expensive. The interfaces between adjoining components in along an exhaust gas flow path are ideally constructed in a manner that limits or prevents leakage, simplifies assembly steps and allows for serviceability without requiring tight manufacturing tolerances on the adjoining components. The present disclosure provides an exhaust system assembly that accomplishes these goals without compromising functionality or performance.

SUMMARY

This section provides a general summary of the disclosure, and is not a comprehensive disclosure of its full scope or all of its features.

In one form, the present disclosure provides an exhaust system including a housing, a tapered duct, a flexible coupling and a service flange. The housing may include an exhaust aftertreatment component disposed therein and may receive exhaust gas from a turbocharger. The duct may include a first opening in fluid communication with the housing and a second opening having a smaller periphery than the first opening. The flexible coupling may fluidly connect the second opening with the turbocharger. The service flange may be mounted within the duct and extend around the periphery of the second opening. The service flange may include a plurality of separate and discrete segments that are individually secured to the duct. Adjacent ones of the segments may define joints that movably connect the segments together while allowing for relative movement between the segments before the housing is fixedly secured to the coupling. The segments may include mounting apertures spaced apart from the joints and receiving fasteners configured to fixedly secure the housing to the coupling. Each fastener may extend through only a single one of the mounting apertures and engage only a single segment of the service flange.

In some configurations, the duct includes mounting apertures receiving the fasteners. The mounting apertures of the duct may have diameters that are larger than diameters of the mounting apertures of the segments.

In some configurations, the fasteners threadably engage the coupling or nuts abutting the coupling.

In some configurations, the exhaust system includes a first gasket disposed between and directly contacting the coupling and the duct.

In some configurations, the duct is formed from sheet metal.

In some configurations, the joints are lap joints.

In some configurations, the exhaust system includes a plurality of flexible tabs disposed within the housing and each having a first end fixed to the housing and a second free end that contacts a corresponding segment of the service flange and clamps the corresponding segment against the duct.

In some configurations, each of the fasteners includes a bolt head and a bolt shaft. The bolt shaft may include an unthreaded portion pressed into the corresponding mounting aperture of the service flange.

In some configurations, the exhaust system includes a second gasket disposed between and directly contacting the service flange and the duct.

In some configurations, the exhaust system includes a third gasket disposed between the service flange and heads of the fasteners.

In some configurations, the only openings into a cavity of the duct in which the service flange is disposed are the first and second openings. The housing may be welded to the duct at the first opening and the exhaust aftertreatment component may restrict access through the first opening into the cavity of the duct. In such configurations, the only available opening through which a service technician may access the service flange after the exhaust system has been initially fully assembled would be through the second opening in the duct (i.e., after removing the coupling from the duct).

In another form, the present disclosure provides an assembly that may include first and second components and a service flange. The first component has a first opening. The second component has a second opening in communication with the first opening. The service flange may be mounted to the first component such that the first component is disposed between the service flange and the second component. The service flange may extend around the periphery of the first opening. The service flange may include a plurality of separate and discrete segments that are individually secured to the first component. Adjacent ones of the segments define joints that movably connect the segments together while allowing for relative movement between the segments before the first component is fixedly secured to the second component. The segments may include mounting apertures spaced apart from the joints and receiving fasteners configured to fixedly secure the first component to the second component. Each fastener may extend through only a single one of the mounting apertures and engage only a single segment of the service flange.

In some configurations, the first component includes mounting apertures receiving the fasteners. The mounting apertures of the first component may have diameters that are larger than diameters of the mounting apertures of the segments.

In some configurations, the fasteners threadably engage the second component or nuts abutting the second component.

In some configurations, the assembly includes a first gasket disposed between and directly contacting the first and second components.

In some configurations, the first component is formed from sheet metal.

In some configurations, the joints are lap joints.

In some configurations, the assembly includes a plurality of flexible tabs each having a first end fixed to the first component and a second free end that contacts a corresponding segment of the service flange and clamps the corresponding segment against the first component.

In some configurations, each of the fasteners includes a bolt head and a bolt shaft. The bolt shaft may include an unthreaded portion pressed into the corresponding mounting aperture of the service flange.

In some configurations, the assembly includes a second gasket disposed between and directly contacting the service flange and the first component.

In some configurations, the assembly includes a third gasket disposed between the service flange and the heads of the fasteners.

In another form, the present disclosure provides a method that may include providing a first component having a first opening and a plurality of first mounting apertures arranged around the first opening; arranging a service flange around the first opening, the service flange having plurality of separate and discrete segments, adjacent ones of the segments defining joints that movably connect the segments together while allowing for relative movement between the segments, each of the segments including at least one of a plurality of second mounting apertures; positioning a second component relative to the first component so that a second opening of the second component is aligned with the first opening, the second component including a plurality of third mounting apertures arranged around the second opening; adjusting a position of at least one of the segments relative to another one of the segments to align the second mounting aperture of the at least one segment relative to the corresponding third mounting aperture; providing a plurality of fasteners and inserting each fastener through corresponding ones of the first, second and third mounting apertures; and fixing the segments relative to the first and second components.

In some configurations, inserting each fastener includes extending each fastener through only a single one of the second mounting apertures and engaging only a single segment of the service flange.

In some configurations, the second mounting apertures are spaced apart from the joints.

In some configurations, arranging the service flange around the first opening includes positioning at least a portion of the first component between the service flange and the second component.

In some configurations, the first mounting apertures have diameters that are larger than diameters of the second mounting apertures.

In some configurations, fixing the segments relative to the first and second components includes threadably tightening the fasteners into the second component or nuts abutting the second component.

In some configurations, the method includes positioning a first gasket between and directly contacting the first and second components.

In some configurations, the method includes clamping the segments against the first component with a plurality of flexible tabs each having a first end fixed to the first component and a second free end that contacts a corresponding segment of the service flange.

In some configurations, each of the fasteners includes a bolt head and a bolt shaft. The bolt shaft may include an unthreaded portion pressed into the corresponding second mounting aperture of the service flange.

In some configurations, the method includes positioning a second gasket between and directly contacting the service flange and the first component.

In some configurations, the method includes positioning a third gasket between the service flange and the heads of the fasteners.

In some configurations, the method includes removing at least one of the segments of the service flange from the first component without moving the other segments relative to the first component.

In some configurations, the method includes repairing or replacing the at least one segment of the service flange and attaching the repaired service flange or the replacement service flange to the first component without moving the other segments relative to the first component.

In some configurations, removing the at least one of the segments of the service flange includes accessing the service flange through the first opening in the first component and removing the at least one of the segments through the first opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a partially exploded perspective view of a service flange of the subassembly;

FIG. 5 is a partial cross-sectional view of the subassembly;

FIG. 6 is a partial cross-sectional view of another configuration of the subassembly;

FIG. 8 is a partial plan view of an exemplary configuration of the service flange;

FIG. 9 is a partial plan view of another exemplary configuration of the service flange;

FIG. 10 is a partial plan view of another exemplary configuration of the service flange;

FIG. 11 is a partial plan view of another exemplary configuration of the service flange; and FIG. 12 is a partial plan view of another exemplary configuration of the service flange.

Corresponding reference numerals indicate corresponding parts throughout the several views of the drawings.

DETAILED DESCRIPTION

Figure 1:
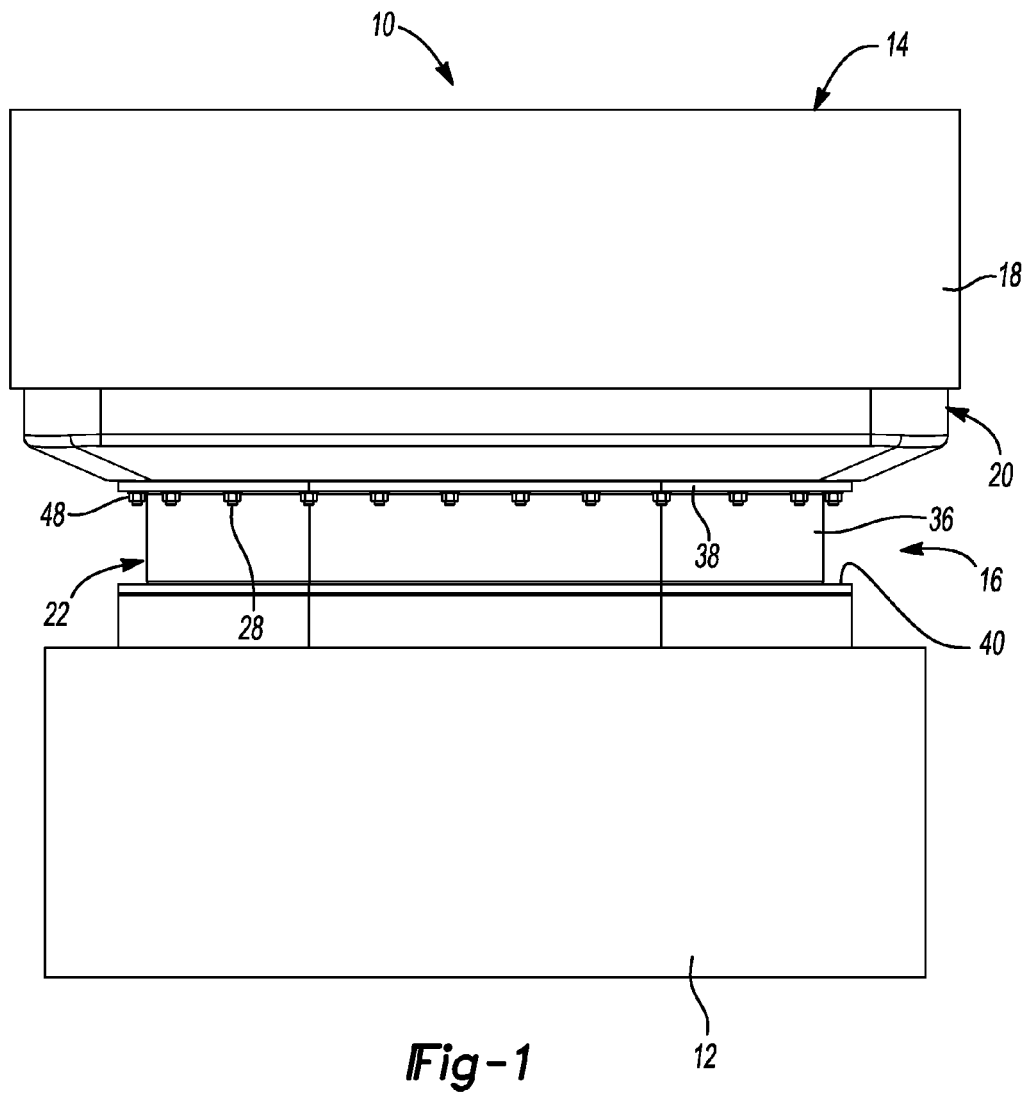
FIG. 1 is a side view of an exhaust system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust system 10 is provided that may include a turbocharger 12 (shown schematically), an exhaust aftertreatment assembly 14 (shown schematically) and a subassembly 16 to fluidly couples the turbocharger 12 with the exhaust aftertreatment assembly 14. The turbocharger 12 receives exhaust gas from a combustion engine (not shown). The exhaust gas flowing through the turbocharger 12 powers a turbine-driven compressor (not shown) and then flows through the subassembly 16 to the exhaust aftertreatment assembly 14. The exhaust aftertreatment assembly 14 may include a housing 18 having one or more filters and/or catalysts (not shown) may be disposed. The filters and/or catalysts can remove particulate matter from the exhaust gas and reduce $NO_x$ levels in the exhaust gas before the exhaust gas is discharged to the ambient atmosphere. It will be appreciated that additional or alternative components can be disposed within the housing 18 and/or elsewhere in the exhaust aftertreatment assembly 14.

As shown in FIGS. 2-5, the subassembly 16 can include a tapered duct 20, a flexible bellows coupling 22, a first gasket 24 and a service flange 26. A plurality of fasteners 28 can fixedly secure the duct 20, the coupling 22, the first gasket 24 and the service flange 26 together, as shown in FIG. 5. The duct 20 can be formed from sheet metal, for example, and defines a cavity 29 having a first opening 30 and a second opening 32. The first opening 30 may have a larger periphery than the second opening 32. The duct 20 may be coupled to the housing 18 at the first opening 30 and coupled to the coupling 22 at the second opening 32 (as shown in FIG. 1). The duct 20 may include a plurality of first mounting apertures 34 (FIGS. 3 and 5) arranged around the second opening 32.

The bellows coupling 22 can include a flexible conduit 36 having first and second flanges 38, 40 disposed at opposing ends 42, 44 thereof. The flanges 38, 40 may extend around the peripheries of the opposing ends 42, 44 and may extend laterally radially outward therefrom. The first and second flanges 38, 40 can be relatively rigid members formed from a metallic material, for example. The first flange 38 can include a plurality of second mounting apertures 46 that are each generally aligned with corresponding ones of the first mounting apertures 34 in the duct 20. In some configurations, the second mounting apertures 46 can be threaded to threadably engage the fasteners 28. In other configurations, the second mounting apertures 46 can be unthreaded—in which case, nuts 48 abutting the first flange 38 may threadably engage the fasteners 28 to clamp the first flange 38 against the first gasket 24 and the duct 20. The second flange 40 can be attached to the turbocharger 12 by fasteners (not shown), for example.

The first gasket 24 may be disposed between the duct 20 and the first flange 38 of the bellows coupling 22 and extend around the peripheries of the second opening 32 of the duct 20 and an opening 41 of the first flange 38 of the bellows coupling 22. In some configurations, the first gasket 24 may directly contact and seal against the duct 20 and the first flange 38. The first gasket 24 can be formed as a single, continuous member and may be formed from any suitable material. In some configurations, the first gasket 24 can be segmented into a plurality of discrete pieces. The first gasket 24 may include a plurality of third mounting apertures 50 that are each generally aligned with corresponding ones of the first mounting apertures 34 in the duct 20 and the second mounting apertures 46 in the first flange 38.

The service flange 26 may include a plurality of separate and discrete segments 52 that abut each other to form a continuous member. Each of the segments 52 may include one or more fourth mounting apertures 54 that are each generally aligned with corresponding ones of the first, second and third mounting apertures 34, 46, 50. In the configuration shown in the figures, the service flange 26 includes four segments 52 of substantially equal length. It will be appreciated, however, that the service flange 26 could include more or less than four segments 52. Furthermore, in some configurations, one or more segments 52 can have different lengths than one or more other segments 52. As shown in FIG. 4, each end 56 of each of the segments 52 may include a ledge 58 that may have a thickness T1 that is approximately half of the a thickness T2 of central portions of the segments 52. Adjacent ledges 58 of adjacent segments 52 may engage each other (e.g., overlap each other) to form a joint 60 that allows movement of the adjacent segments 52 relative to each other and relative to the duct 20 before the fasteners 28 are threadably tightened (either into nuts 48 or into the second mounting apertures 46) to fixedly clamp the segments 52 relative to the duct 20. The ledges 58 may be configured so that shoulders 59 that define ends of the ledges 58 can be moved toward and away from each other. Additionally, the shaped of the ledges 58 allows movement of lateral movement of the segments 52 (i.e., in a direction parallel to the shoulders 59). In the configuration shown in FIG. 2, the service flange 26 is disposed within the cavity 29 of the duct 20 and may directly or indirectly contact the duct 20.

As shown in FIG. 4, the joints 60 between adjacent segments 52 can be lap joints. FIGS. 8-12 depict alternative configurations of joints 60 formed by the ends 56 of the segments 52. FIG. 8 depicts ledges 158 that each have widths that are approximately half of the widths of the central portions of the segments 52. FIGS. 9-12 depict configurations in which one end 56 of one segment 52 includes a male portion 258 and the adjacent end 56 of the adjacent segment 52 includes a female portion 259 that movably receives the male portion 258. The male and female portions 258, 259 could have any suitable rectangular, angled or curved shapes, for example.

Figure 2:
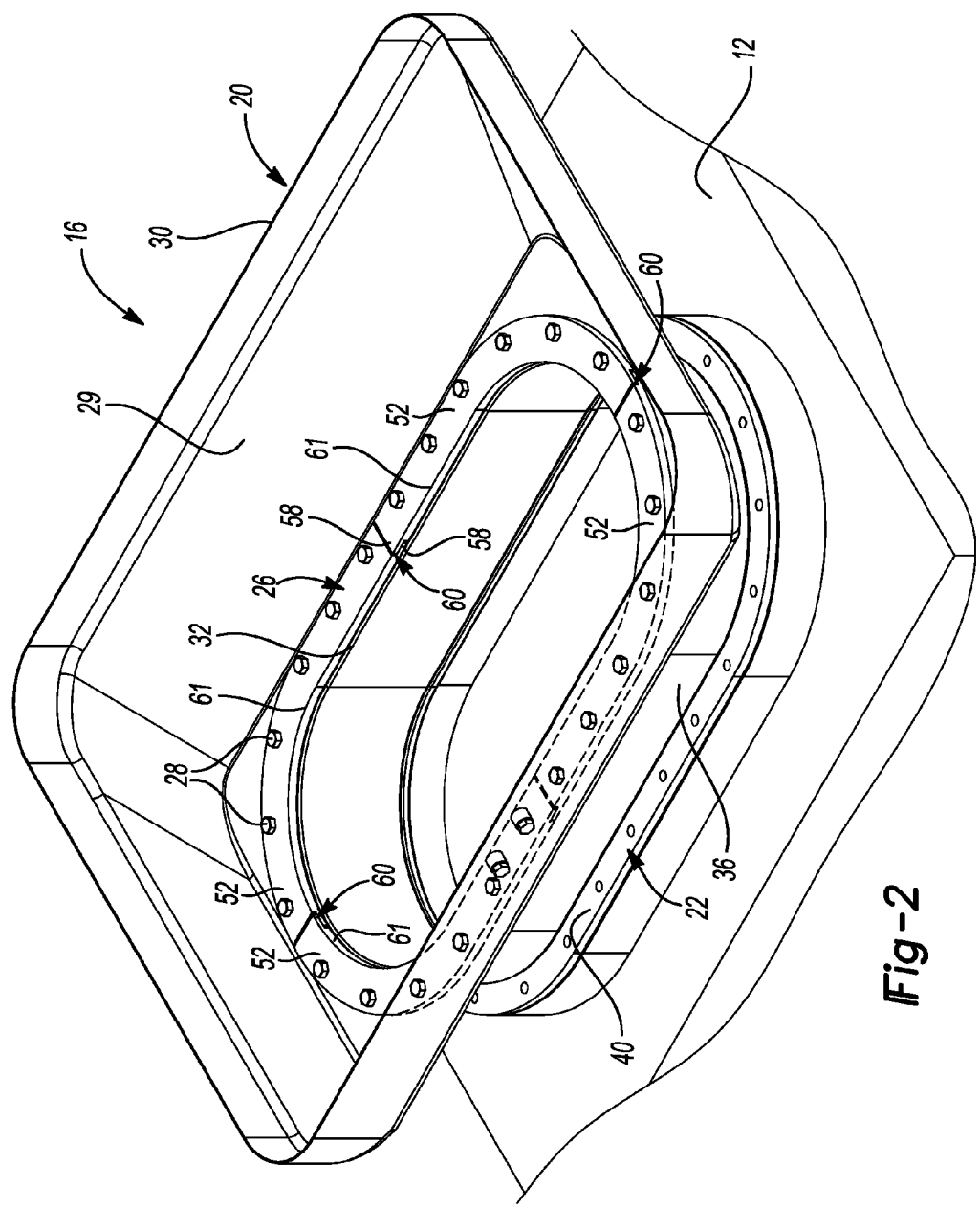
FIG. 2 is a perspective view of a subassembly of the exhaust system of FIG. 1.
Figure 3:
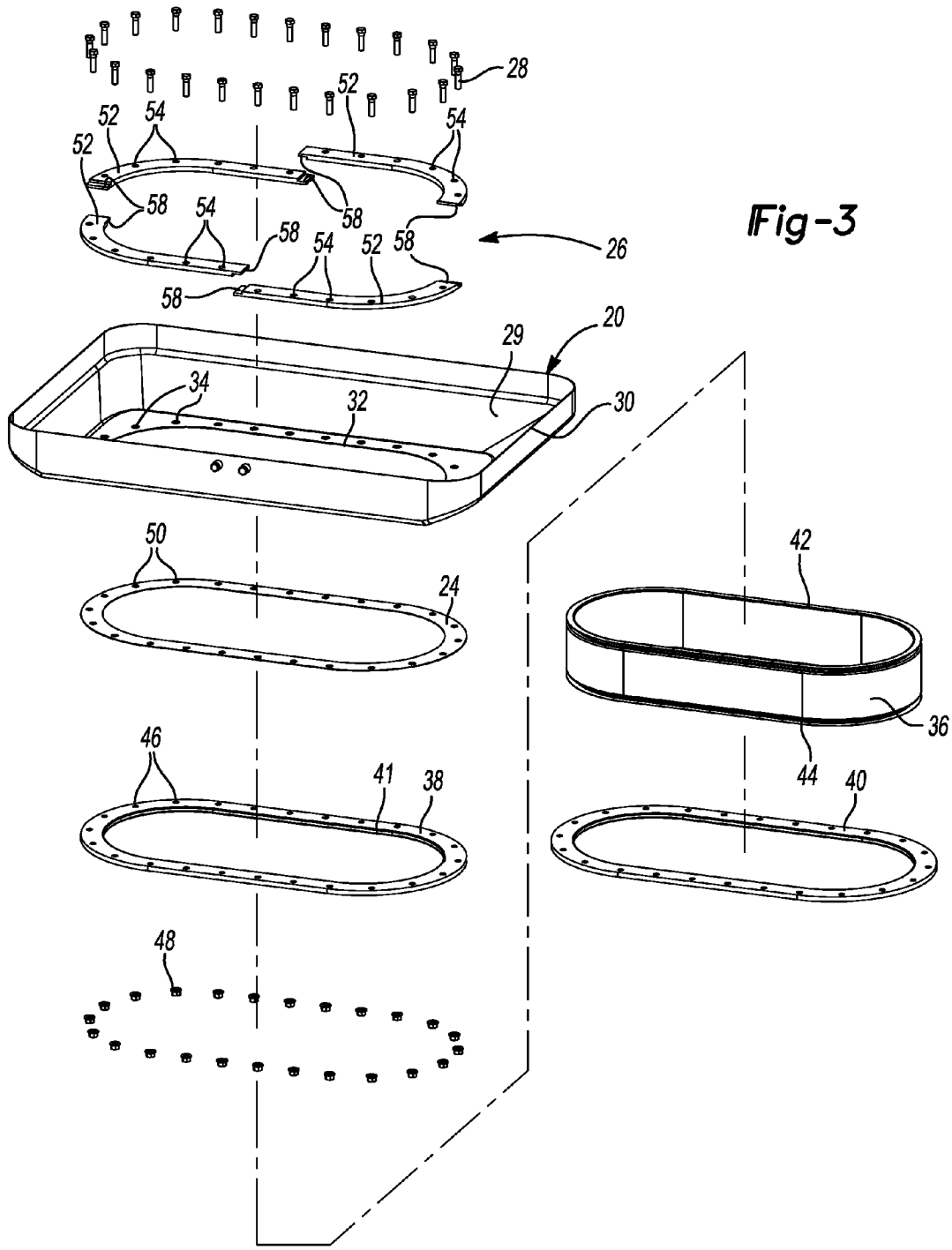
FIG. 3 is an exploded perspective view of the subassembly of the exhaust system.

In some configurations (e.g., as shown in FIG. 2), radially inwardly facing surfaces 61 of the segments 52 (i.e., the surfaces that define an inner circumference of the service flange 26) may be free from contact with any part of the duct 20, the gasket 24, the bellows coupling 22 and/or any other component of the system 10.

As shown in FIG. 5, each of the fasteners 28 may include a head portion 62 and a shaft portion 64. The head portion 62 may be disposed within the cavity 29 and may directly or indirectly abut against the service flange 26. The shaft portion 64 may extend through the first, second, third and fourth mounting apertures 34, 46, 50, 54. The shaft portion 64 may include a threaded (or partially threaded) portion 66 and an unthreaded portion 68 disposed between the threaded portion 66 and the head portion 62. In the configuration shown in FIG. 5, one of the nuts 48 may threadably engage the threaded portion 66 so that the duct 20, the service flange 26, the first gasket 24, and the first flange 38 of the bellows coupling 22 are all clamped together.

As shown in FIG. 5, the unthreaded portion 68 may have a diameter that is larger than the diameter of the threaded portion 66. The diameter of the unthreaded portion 68 and the diameter of the fourth mounting apertures 54 in the service flange 26 may be sized for a relatively close fit. In some configurations, the fit between the unthreaded portions 68 and the fourth mounting apertures 54 may be a press fit.

As shown in FIG. 5, the diameters of the first mounting apertures 34 in the duct 20 may be significantly larger than the diameters of the fourth mounting apertures 54 and the threaded and/or unthread portions 66, 68 of the fasteners 28. Therefore, manufacturing tolerances for the diameters and locations of the first mounting apertures 34 and the tolerances for the locations of the fourth mounting apertures 54 can be relatively loose. The diameters of the second and third mounting apertures 46, 50 may be smaller than the diameter of the first mounting apertures 34 so that the fits between the threaded portion 66 of the fasteners 28 and the second and third mounting apertures 46, 50 can be relatively close.

With continued reference to FIGS. 1-7, a method of assembling the subassembly 16 will be described. The subassembly 16 can be assembled before or after the duct 20 is attached to the housing 18 and/or before or after the bellows coupling 22 is attached to the turbocharger 12. The segments 52 of the service flange 26 can be individually inserted into the cavity 29 of the duct 20 through the first opening 30 or through the second opening 32 if the duct 20 is already attached to the housing 18. Inside of the cavity 29, the segments 52 can be positioned on the duct 20 around the second opening 32 such that the fourth mounting apertures 54 are generally axially aligned with the first mounting apertures 34 and such that the ledges 58 of adjacent segments 52 movably contact each other. The fasteners 28 can be inserted through corresponding apertures 34, 54, as shown in FIG. 5.

As shown in FIG. 6, a second gasket 25 can be disposed between and sealingly contact the duct 20 and the service flange 26. Additionally or alternatively, a third gasket 27 can be disposed between and sealingly contact the head portions 62 of the fasteners 28 and the service flange 26. In such configurations, the fasteners 28 can also be inserted through mounting apertures of the second and third gaskets 25, 27.

Figure 7:
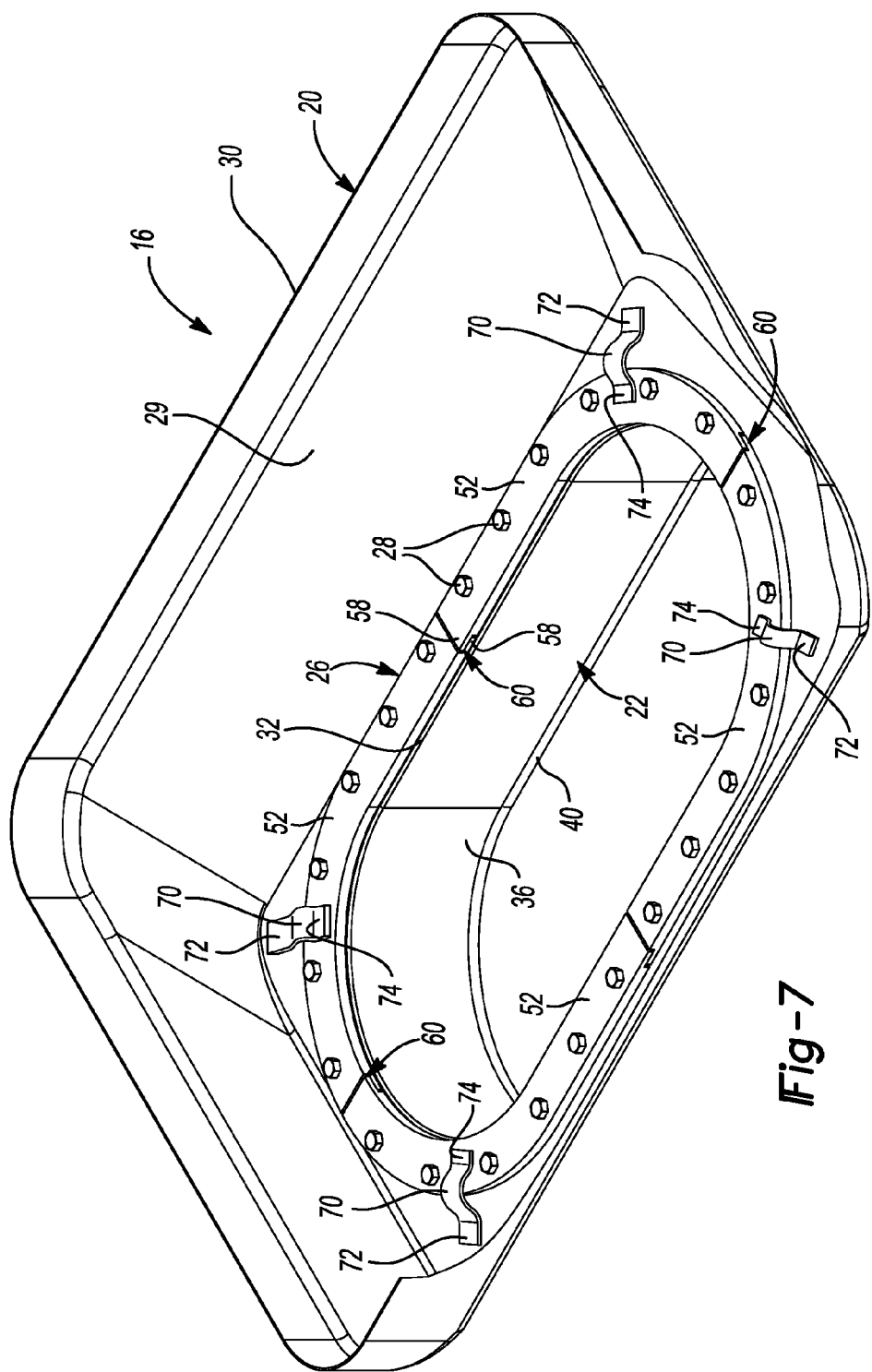
FIG. 7 is a partial perspective view of an exemplary configuration of a duct and service flange of the subassembly.

As shown in FIG. 7, the duct 20 may include a plurality of hold-down tabs 70 that can clamp the segments 52 against the duct 20 before the fasteners 28 are threadably tightened into the nuts 48. Each of the tabs 70 can include a fixed end 72 that can be welded, fastened (e.g., with threaded fasteners, rivets, etc.) or otherwise fixed to the duct 20 and a free end 74 that biases the segments 52 against the duct 20. The tabs 70 may be resiliently flexible so that the segments 52 can be inserted underneath the free end 74 and clamped in place. The spring force of the tabs 70 may be strong enough to firmly hold the segments 52 in place while allowing the segments 52 to be moved by hand relative to each other and the duct 20. The duct 20 can include one or more tabs 70 for each segment 52.

Next, the first gasket 24 and the bellows coupling 22 can be positioned relative to the duct 20 so that the fasteners 28 can be received into the second and third mounting apertures 46, 50. The positions of one or more of the segments 52 may need to be shifted relative to the duct 20 and the other segments 52 in order to allow all of the fasteners 28 to be inserted into the corresponding mounting apertures 34, 46, 50, 54 due to variations in the relative locations of the mounting apertures 34, 46, 50, 54 (i.e., due to manufacturing tolerances). The relatively large diameters of the first mounting apertures 34 of the duct 20 and the movability of the segments 52 relative to each other and relative to the duct 20 allows for the fasteners 28 to be received into the mounting apertures 34, 46, 50, 54 despite some misalignment of the mounting apertures 34, 46, 50, 54. Once the segments 52 are positioned, as necessary, relative to duct 20, the fasteners 28 can be inserted through the second and third mounting apertures 46, 50 and the nuts 48 can be threadably tightened onto the ends of the fasteners 28 to fix the service flange 26, the duct 20, the gasket(s) 24, 25, 27 and the bellows coupling 22 relative to each other.

It will be appreciated that the order of one or more of the operations described above can be varied from the order described above. Further, while the head portions 62 of the fasteners 28 are described above as being disposed within the cavity 29 of the duct 20, it will be appreciated that the fasteners 28 could be oriented into the opposite direction so that the nuts 48 are disposed within the cavity 29 and the head portions 62 adjacent the first flange 38 of the bellows coupling 22. In some configurations, the nuts 48 could be welded to the segments 52. In some configurations, the fourth mounting apertures 54 of the service flange 26 could be threaded to threadably engage the fasteners 28. In some configurations, the head portions 62 could be permanently welded to the segments 52.

Once the subassembly 16 is fully assembled and securely attached to the turbocharger 12 and the housing 18, the subassembly 16 forms a sealed conduit through which exhaust gas can flow from the turbocharger 12 and into the aftertreatment assembly 14. In the event that one or more of the segments 52 of the service flange 26 is damaged after the exhaust system 10 is fully assembled, the damaged one or more of the segments 52 can be removed and repaired or replaced without removing or loosening one or more of the undamaged segments 52.

In some configurations, the only openings into the cavity 29 of the duct 20 may be first and second openings 30, 32 (i.e., the duct 20 may not include a service access panel or door), and the duct 20 can be permanently welded to the housing 18. In such configurations, catalysts and/or other components in the housing 18 may restrict access into the cavity 29 of the duct 20 through the first opening 30 so that the only pathway into the cavity 29 through which a service technician could access the service flange 26 after the subassembly 16 is initially assembled onto the housing 18 would be through the second opening 32 of the duct 20. Accordingly, to repair or replace a damaged fastener 28 or segment 52 of the service flange 26, a service technician would remove the nuts 48 from the fasteners 28 to allow the bellows coupling 22 to be detached from the duct 20 so that the service technician could remove selected fasteners 28 and/or selected segments 52 through the second opening 32 of the duct 20.

While the service flange 26 is described above as being used to attach the duct 20 to the bellows coupling 22, it will be appreciated that the segmented service flange 26 of the present disclosure could be used to attach any two or more components to each other.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly comprising:
   a first component including an end wall at least partially defining a pressurized cavity, the end wall including a central aperture and fastener apertures surrounding the central aperture;
   a second component having a second opening in communication with the first opening and the pressurized cavity, the second component including a mounting flange surrounding the second opening and extending parallel to the end wall; and
   a service flange mounted on a surface of the end wall and being positioned within the pressurized cavity of the first component such that the surface is disposed between the service flange and the mounting flange of the second component, the service flange extending around a periphery of the first opening, the service flange including a plurality of separate and discrete segments that are individually secured to the first component, wherein adjacent ones of the segments define joints that movably connect the segments together while allowing for relative movement between the segments before the first component is fixedly secured to the second component, the segments including mounting apertures spaced apart from the joints and receiving fasteners configured to extend through the fastener apertures and fixedly secure the first component to the second component, each fastener extending through only a single one of the mounting apertures and engaging only a single segment of the service flange to clamp the end wall between the service flange and the mounting flange.

2. The assembly of claim 1, wherein the fastener apertures of the first component include diameters that are larger than diameters of the mounting apertures of the segments.

3. The assembly of claim 2, further comprising a first gasket disposed between and directly contacting the first and second components.

4. The assembly of claim 3, wherein the first component is formed from sheet metal.

5. The assembly of claim 4, wherein the joints are lap joints.

6. The assembly of claim 5, further comprising a plurality of flexible tabs each having a first end fixed to the first component and a second free end that contacts a corresponding segment of the service flange and clamps the corresponding segment against the first component.

7. The assembly of claim 6, wherein each of the fasteners includes a bolt head and a bolt shaft, the bolt shaft including an unthreaded portion pressed into the corresponding mounting aperture of the service flange.

8. The assembly of claim 7, further comprising a second gasket disposed between and directly contacting the service flange and the first component.

9. The assembly of claim 1, wherein the surface of the first component is planar and the segments each include a planar sealing surface extending between opposite ends of the segments such that a surface area of the service flange is maximized.

10. An assembly comprising:
    a first component including a wall having a first opening, the wall at least partially defining a pressurized cavity;
    a second component having a second opening in communication with the first opening and the pressurized cavity, the second component including a mounting flange surrounding the second opening and extended parallel to the wall; and
    a service flange mounted on a surface within the pressurized cavity of the first component such that the surface is disposed between the service flange and the mounting flange of the second component, the service flange extending around a periphery of the first opening, the service flange including a plurality of separate and discrete segments that are individually secured to the first component, the service flange including joints movably connecting adjacent segments while allowing for relative movement between the segments before the first component is fixedly secured to the second component, each segment including a first end and a second end, the first end of each of the segments being shaped to receive the second end of the adjacent segment such that each first end includes a first surface complementary in shape to a second surface on each second end, the segments including mounting apertures spaced apart from the joints and receiving fasteners configured to fixedly secure the first component to the second component, each fastener extending through only a single one of the mounting apertures and engaging only a single segment of the service flange.

11. The assembly of claim 10, wherein the first component includes mounting apertures receiving the fasteners, the mounting apertures of the first component having diameters that are larger than diameters of the mounting apertures of the segments.

12. The assembly of claim 11, further comprising a first gasket disposed between and directly contacting the first and second components.

13. The assembly of claim 12, wherein the first component is formed from sheet metal.

14. The assembly of claim 13, wherein the joints are lap joints.

15. The assembly of claim 14, further comprising a plurality of flexible tabs each having a first end fixed to the first component and a second free end that contacts a corresponding segment of the service flange and clamps the corresponding segment against the first component.

16. The assembly of claim 15, wherein each of the fasteners includes a bolt head and a bolt shaft, the bolt shaft including an unthreaded portion pressed into the corresponding mounting aperture of the service flange.

17. The assembly of claim 16, further comprising a second gasket disposed between and directly contacting the service flange and the first component.

18. The assembly of claim 10, wherein the surface of the first component is planar and the segments each include a planar sealing surface extending between opposite ends of the segments such that a surface area of the service flange is maximized.

19. An assembly comprising:
a first component including a wall having a first opening, the wall at least partially defining a cavity and including a first plurality of fastener apertures surrounding the first opening;
a second component including a second opening in communication with the first opening and the cavity, the second component including a mounting flange surrounding the second opening and extending parallel to the wall, the mounting flange including a second plurality of fastener apertures surrounding the second opening and positioned to align with the first plurality of fastener apertures; and
a service flange positioned within the cavity and extending substantially parallel to the wall and the mounting flange, the service flange including a plurality of separate and discrete segments extending about a periphery of a first opening, each segment including at least one mounting aperture, a first end and a second end, the first end of each of the segments being shaped to receive the second end of the adjacent segment such that each first end includes a first surface complementary in shape to a second surface on each second end, the first surface and the second surface each being configured such that the segments may be moved relative to each other and relative to the first component to align the first plurality of fastener apertures, the second plurality of fastener apertures and the mounting apertures of each segment for receipt of fasteners configured to fixedly secure the first component to the second component and clamp the wall between the service flange and the mounting flange.

20. The assembly of claim 19, wherein the joints are lap joints.

21. The assembly of claim 20, further comprising a plurality of flexible tabs each having a first end fixed to the first component and a second free end that contacts a corresponding segment of the service flange and clamps the corresponding segment against the first component.

22. The assembly of claim 21, wherein each of the fasteners includes a bolt head and a bolt shaft, the bolt shaft including an unthreaded portion pressed into the corresponding mounting aperture of the service flange.

* * * * *